United States Patent
Taylor et al.

(10) Patent No.: US 7,420,477 B2
(45) Date of Patent: Sep. 2, 2008

(54) METHOD FOR AN ENHANCED ABSOLUTE POSITION SENSOR SYSTEM

(76) Inventors: John P Taylor, 3438 Mercer La., San Diego, CA (US) 92122; Nicholas L Taylor, P.O. Box 576, Pine Valley, CA (US) 91962

( * ) Notice: Subject to any disclaimer, the term of this patent is extended or adjusted under 35 U.S.C. 154(b) by 0 days.

(21) Appl. No.: 11/498,457

(22) Filed: Aug. 2, 2006

(65) Prior Publication Data

US 2008/0030381 A1 Feb. 7, 2008

(51) Int. Cl.
*H03M 1/22* (2006.01)

(52) U.S. Cl. .......................... 341/9; 400/472

(58) Field of Classification Search ............. 341/9, 341/13, 15; 400/472; 700/259
See application file for complete search history.

(56) References Cited

U.S. PATENT DOCUMENTS

| | | | |
|---|---|---|---|
| 4,730,110 A | 3/1988 | Spaulding | |
| 4,990,909 A | 2/1991 | Ueda et al. | |
| 5,943,476 A * | 8/1999 | Dougherty et al. | 700/259 |
| 6,411,082 B2 | 6/2002 | Glasson | |
| 6,492,807 B2 | 12/2002 | Spellman | |
| 6,542,088 B1 | 4/2003 | Bielski et al. | |
| 6,985,018 B2 | 1/2006 | Madni et al. | |
| 7,012,704 B2 | 3/2006 | Suzuki et al. | |
| 7,017,274 B2 | 3/2006 | Stobbe | |
| 7,023,203 B2 | 4/2006 | Miyashita et al. | |
| 7,034,282 B2 | 4/2006 | Oka et al. | |
| 7,046,172 B2 | 5/2006 | Berthou | |
| 7,046,176 B2 | 5/2006 | Okamuro et al. | |
| 2004/0114982 A1 * | 6/2004 | Lip | 400/472 |

* cited by examiner

*Primary Examiner*—Jean B. Jeanglaude
*Assistant Examiner*—Joseph Lauture

(57) ABSTRACT

An absolute position of a rotating axis is sensed at a desired resolution by employing two or more absolute encoders of a resolution that is lower than the desired resolution. A first absolute encoder that rotates in concert with the axis being sensed and a second absolute encoder that rotates a number of times for each rotation of the first encoder are employed. While the second absolute encoder data is utilized directly, the first absolute encoder data, through an interpretation of the context of the second absolute encoder data, is translated to a quantity equivalent to the rotational count of the second absolute encoder. Additionally, the data from the first and second absolute encoders can be manipulated so as to make a mechanical misalignment between the encoders or a temporal misalignment between their readings to be essentially inconsequential to the operation and accuracy of the enhanced absolute position sensor system.

1 Claim, 8 Drawing Sheets

METHOD FOR AN ENHANCED ABSOLUTE POSITION SENSOR SYSTEM

The present invention relates to the field of position measurement; and more specifically, the present invention relates to the measurement of an absolute angular position of a rotating shaft.

BACKGROUND OF THE INVENTION

1. Prior Art

A machine may be created that is then operated by a control system referred herein to as a "Computer". During operation of this machine, the computer may need to ascertain the position of various mechanical elements, referred singly herein to as an "Axis". The axis may be moved relative to the other components of the machine and or to some fixed position relative to a location in which the machine is installed. For machines for which the movement is rotational, the position of the axis is generally reported as an angle in degrees from some arbitrary origin where that origin is reasonably expected to be the same from one use of the machine to the next. In the course of the design of the computer and machine, the angular position of the axis may be represented in the standard form in the art of 0 to 360 degrees or as an arbitrary range of values which may then be translated to the standard form or used as is. An example of an arbitrary range would be 0 to 9,999 counts wherein a count would generally be the smallest increment of rotation that can be measured. As is generally accepted and would be familiar to one skilled in the art, the "Resolution" of an axis measurement will interchangeably be referred to as the smallest increment of angle which is represented by one count or as the total number of incremental counts which comprises a full rotation about the axis. By way of example, a resolution of one degree would generally be considered as being interchangeably referred to as a resolution of 360 counts.

The computer that controls the machine may get its axis position data from sensors known as encoders, which may be of the incremental or absolute types for example. Each axis within the machine may utilize encoders of the same type or may combine different types as dictated by the design of the system. Ultimately, whatever type of encoder is employed, these encoders will produce within the computer a grouping of digital bits that represent the position of the sensed axis. These bits may then be interpreted and or acted upon as required by the design of the system.

Incremental encoders count, or emits pulses that represent the finite increments of rotation of the axis to which they are coupled. These pulses generally contain no information about the actual absolute position of the axis but usually will indicate the direction of rotation. Generally, an incremental encoder will be coupled either directly to the axis of rotation or, for example, to the drive motor of a geared down system in order enhance the resolution of the encoder by means of multiplication of the number of rotations of the encoder versus the rotation of the axis to which it is coupled. The absolute position will generally be established at the beginning of operation by moving the axis to a known location, herein referred to as the "Home" position. After establishing this initial position about the axis, the computer may then count increments in either direction of rotation and thus move to any desired angle of the axis represented by a specific number of those increments. If when the computer is powered down, the count of increments to the known home position is lost and therefore the current position about the axis is unknown, then the computer must reestablish the home position every time it is powered up. This is especially true if the axis has the possibility of being moved while the computer is off or is otherwise unable to sense this movement. When undetected movement is possible, even the retention of a "Current" count through means such as a battery backed up memory for example will not ensure proper positioning upon returning to normal operation. It must be noted that this incremental encoder may not always be an actual sensor but may be intrinsic to the operation of the drive system, as is the case when the computer counts commanded incremental steps of movement of a synchronous drive motor, herein referred to as a "Stepper motor". In the case of a computer which counts stepper motor increments, a loss of position information may occur should a step of movement not occur as commanded, commonly referred to as a "Stall" or when an external force is applied which exceeds the ability of the stepper motor to maintain its expected position, commonly referred to as "Cogging".

Absolute encoders overcome the loss of position shortcoming inherent to incremental encoders as they are generally capable of reporting position information for a sensing element coupled to the axis that they are meant to sense, without the need of repeated initialization with regards to their position about that axis or the maintenance of power at all times. Absolute encoders have been realized in a variety of manners including optical disks with one or more patterns that directly represent the angular position of the pattern, "Synchros" which are rotating transformers with windings with specific phase-to-position relationships that may be translated to a digital form with electronics and magnetic field position sensing encoders. The benefits of an absolute encoder of a given resolution may generally be considered to come at a significant cost premium versus an incremental encoder capable of the same resolution, this added cost most generally stemming from a significant increase in complexity of manufacture for the absolute encoder versus the incremental encoder. An absolute encoder of "n+1" bits will represent an increase in resolution that is double that of an encoder of "n" bits, so for two absolute encoders of similar design even one more bit of resolution may be found to incur a significant difference in cost. Where a requirement of encoder bits causes the cost of a desirable absolute encoder to exceed the available monetary resources of a particular project, the system designer may be forced to employ a lower cost incremental encoder of equivalent resolution, while forgoing the advantages that an absolute encoder would have afforded. Alternatively, the system designer may select an absolute encoder of lower resolution that desired to retain the benefits of the absolute encoder.

An absolute encoder of greater resolution than the basic form as described above would permit may be realized in what is known in the art as a "Multi-turn" absolute encoder. A multi-turn absolute encoder typically utilizes the resolution multiplication technique of the geared-up incremental encoder described above. An example of a prior art multi-turn absolute encoder employs an integrated speed-reducing gears that is then coupled to a turn counting device. Common limitations for the accuracy of an encoder where speed reduction gears are employed includes but is not limited to, errors from backlash, mechanical alignment or mechanical wear. Of particular concern to the system designer, these errors would be separate from and typically uncorrelated to, the same mechanical errors within the axis drive train to which the encoder is coupled. A second example of a prior art multi-turn absolute encoder is the magnetic bubble counting type that while not necessarily manifesting the same mechanical error sources of the gear reduction apparatus, introduces its own shortcomings including costs commensurate with the complexities of realization, all of which may not be trivial to a system designer.

2. Objects and Advantages

Accordingly, besides the advantages of absolute encoders as generally stated above, the objects and advantages of the present invention are:

(a) to produce an enhanced absolute position reading from a plurality of absolute encoders of lower resolution than the desired resolution of the enhanced absolute position reading;

(b) to utilize mechanical elements within an existing mechanical system or an ancillary mechanical element for the purpose of resolution multiplication;

(c) to enable a convenient and economical installation of the absolute encoders upon the existing mechanical system or the ancillary mechanical element with minimal regard to the actual mechanical alignment of the encoders;

(d) to provide a means by which a mechanical and or temporal alignment between the encoders which stems from the installation of the encoders may be reduced or eliminated; and (e) to provide a mathematical means to predict the operational limits of the enhanced absolute position sensor system.

Still further objects and advantages will become apparent from a consideration of the ensuing description and drawings.

SUMMARY

A method for an enhanced absolute position sensor system for producing an enhanced absolute position reading having a number of rotation count bits and a number of rotation position bits is disclosed. In an exemplary embodiment, at least two encoders are arranged such that a first absolute encoder is coupled to an axis to be measured such that it will rotate in concert with the axis. A second absolute is coupled so as to rotate an integer multiple number of times greater than one for each full rotation of the first absolute encoder. A computational means is provided whereby the mechanical misalignment of the encoders is minimized to an extent possible. The first absolute encoder and second absolute encoder are read within a prescribed time period. The second absolute encoder reading is transferred directly into the rotation position bits of the enhanced absolute position reading and the first absolute encoder reading is manipulated according to the context the second absolute encoder reading to produce an alignment corrected rotation count of the second absolute encoder. The alignment corrected rotation count is transferred into rotation count bits of the enhanced absolute position reading that may then be utilized by an external system or as an integral part of a local system.

DRAWINGS—FIGURES

DETAILED DESCRIPTION—FIG. 1—PREFERRED EMBODIMENT

Figure 1:
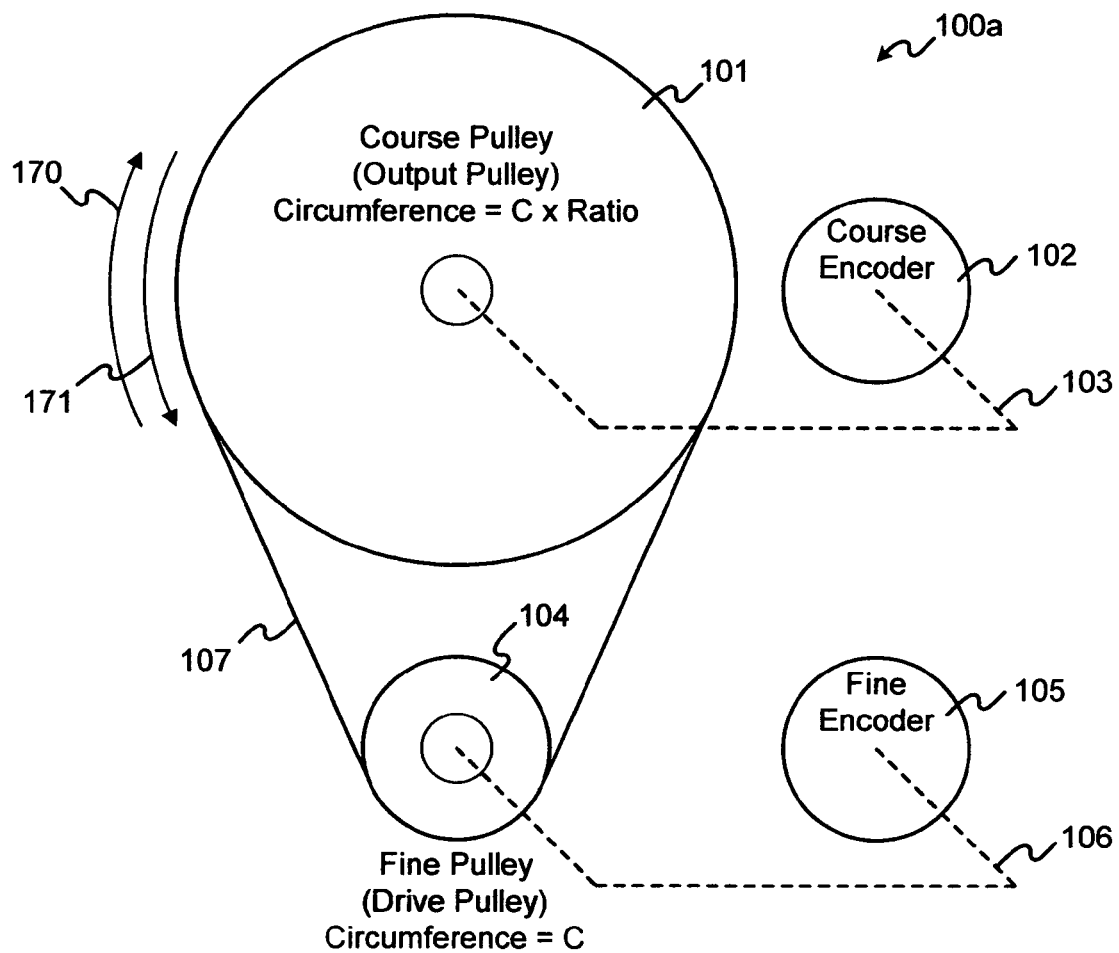
FIG. 1 illustrates an exemplary arrangement of a course and a fine encoder, encoder couplings, pulleys and a power transmission belt wherein the encoders lie within the drive chain in one embodiment of the present invention.

Referring first to FIG. 1, there is shown an exemplary arrangement of mechanical and encoder elements in accordance with a preferred embodiment of the present invention. As discussed below, course encoder 102 and fine encoder 105, when coupled into such an appropriate mechanical system and processed with an appropriate algorithm will yield positional data with resolution greater than fine encoder 105 is alone capable of producing.

By way of illustration, the encoder system 100a is suitable to convert the angular position of an axis in a mechanical device such as a camera pointing system such that the camera may be pointed repeatedly at some target location in the environment into which it is installed. A typical system would include, among other things, motors to provide forces with which to effect movement of the camera in either direction about one or more axis, belts, pulleys or similar elements to transfer those forces, and electronic devices such as computers within and without the mechanical device which are capable of controlling said motors in addition to interpretation, computation and storing of information related to the positions to which the device will be commanded to move. As such, encoder system 100a may be integrated into the camera control system for example to provide positional data and allow accurate, repeated pointing of the attached camera.

Although not shown for ease of illustration in FIG. 1, a motor will typically be attached to the drive pulley 104 which is then also connected to motor control electronics and ultimately to a system control computer. The actual mechanical elements and configuration chosen to transfer the force from the motor to the axis may also be sprockets with chains and gears for example, or any combination of these devices as dictated by the mechanical design requirements. What limitations on the mechanical system are dictated by the encoder system will be detailed below. Course encoder 102 and fine encoder 105 may be connected to the machines control system or to some other computer, to which data may be read from said encoders and then processed according to the present invention by a means familiar to those experienced in the art. The computer enlisted to implement the requirements of the present invention will have whatever inputs and outputs, memory both volatile and non-volatile and other elements as required for this and all other functions it is expected to perform.

As depicted in FIG. 1 and for one embodiment for the present invention, an output pulley 101 which rotates about the axis to be measured is coupled by drive belt 107 to the drive pulley 104. A course encoder 102 is coupled via coupler 103 to the output pulley 101 and fine encoder 105 is similarly coupled via coupler 106 to the drive pulley 104. Couplers 103 and 106 may be of various mechanical, optical, magnetic or other types as required by the particular models of the course and fine encoders employed. Both the course encoder 102 and fine encoder 105 must be capable of reporting absolute angular position but do not need to be of the same model, type, electrical interface or resolution to be employed in the present invention. By way of example, a magnetically coupled encoder may be employed for the course encoder 102 paired with an optical scale encoder employed as the fine encoder 105. The requirement for the number of bits of resolution for the course and fine encoders will be discussed in detail below.

For the exemplary embodiment of the present invention, the convention used herein will be that the direction of rotation of the output pulley 101, alternatively referred to as the "Axis". A movement of the axis in the forward direction 170 as reported by both the course encoder 102 and fine encoder 105 will be indicated as an increase in counts whereas a movement of the axis in the reverse direction 171 as reported by both the course encoder 102 and fine encoder 105 will be indicated as a decrease in counts. The specific manipulation of the reported position information from either encoder for the purpose of implementation in this or any other embodiment of this invention, such as inversion of a reading to cause the count to appear to increase for forward rotation of the axis, is familiar to those skilled in the art and so will not be further covered herein.

The exemplary embodiment of the present invention requires that the ratio, or alternatively "Gear ratio", between the output pulley 101 and the drive pulley 104 be an integer multiple greater than one such as 2:1 or 3:1 where the resulting enhanced resolution of the entire encoder system will be that ratio multiplied by the resolution of the fine encoder 105. By way of example, a mechanical gear ratio of 4:1 paired with a fine encoder 105 of 4096 counts of resolution will yield an enhanced position resolution of 16,384 counts per full rotation of the course pulley 101. For the exemplary embodiment of the present invention the gear ratio will be understood to be 16:1 and the resolution of the fine encoder will be 4,096 counts, resulting in an enhanced absolute position resolution of 65,536 counts.

Figure 2:
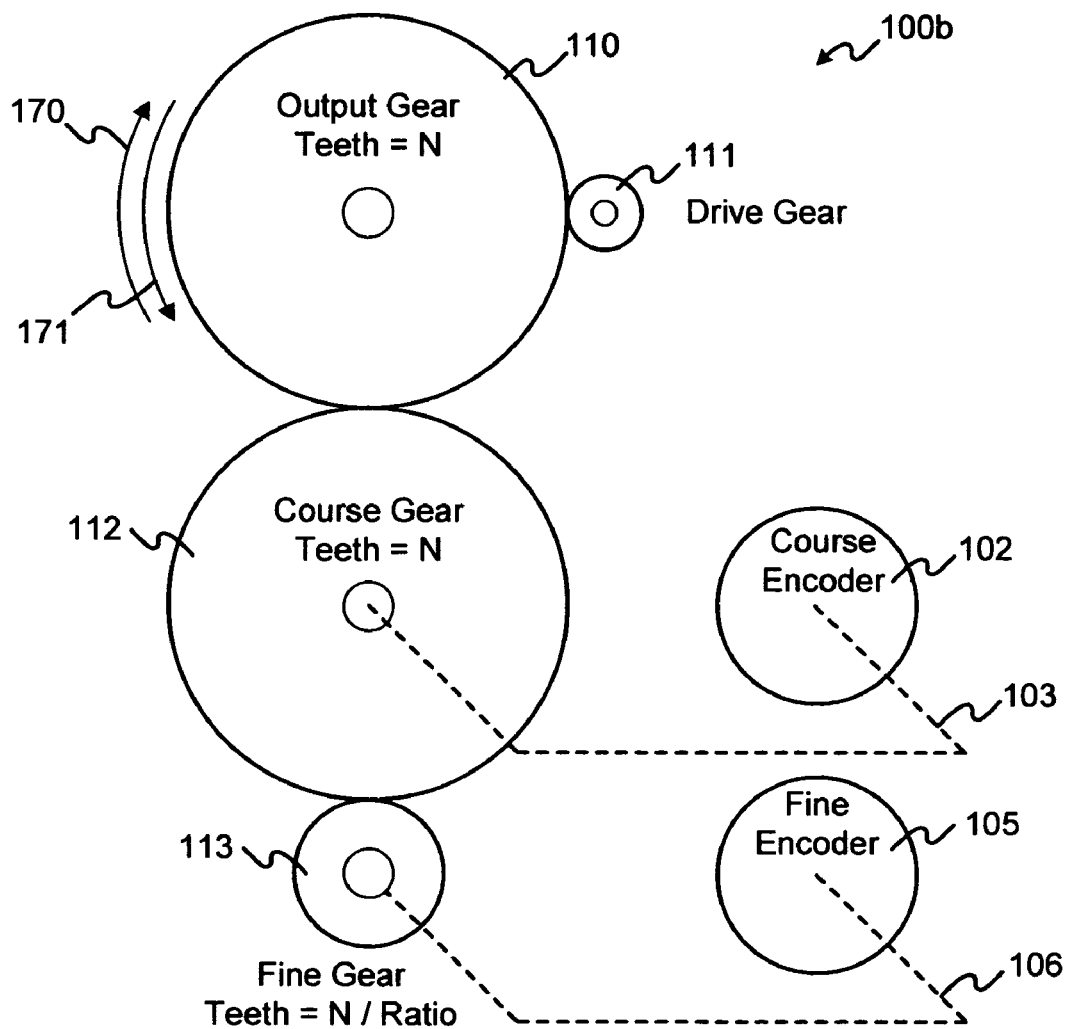
FIG. 2 illustrates an alternative exemplary arrangement of a course and a fine encoder, encoder couplings and gears wherein the encoders lie outside the drive chain.

In the exemplary embodiment of the invention shown in FIG. 1, the force transmitted by the drive pulley 104 to the output pulley 101 through the drive belt 107 could result in a strain on the belt resulting in a backlash error; i.e. the drive pulley 104 must move some finite angle before that movement is transmitted to the output pulley 101 inducing an axis position measurement error in the encoder system 100a. Backlash and the resultant error is not particular to the present invention so will not be covered herein in detail, however for completeness and to introduce additional benefits of the present invention, the proceeding paragraph for the present embodiment and the description of an alternate embodiment as shown in FIG. 2 shall be included.

An example of a method to compensate for backlash induced errors such as described in the preceding paragraph could include for example, but not be limited to, selecting a drive belt 107 that is more rigid or may contain teeth as in a "Gear belt" and therefore transmits power from the drive pulley 104 to output pulley 101 more effectively.

Detailed Description—FIGS. 1, 3, 4, 5, 6, 7 and 8—Operation

Figure 3:
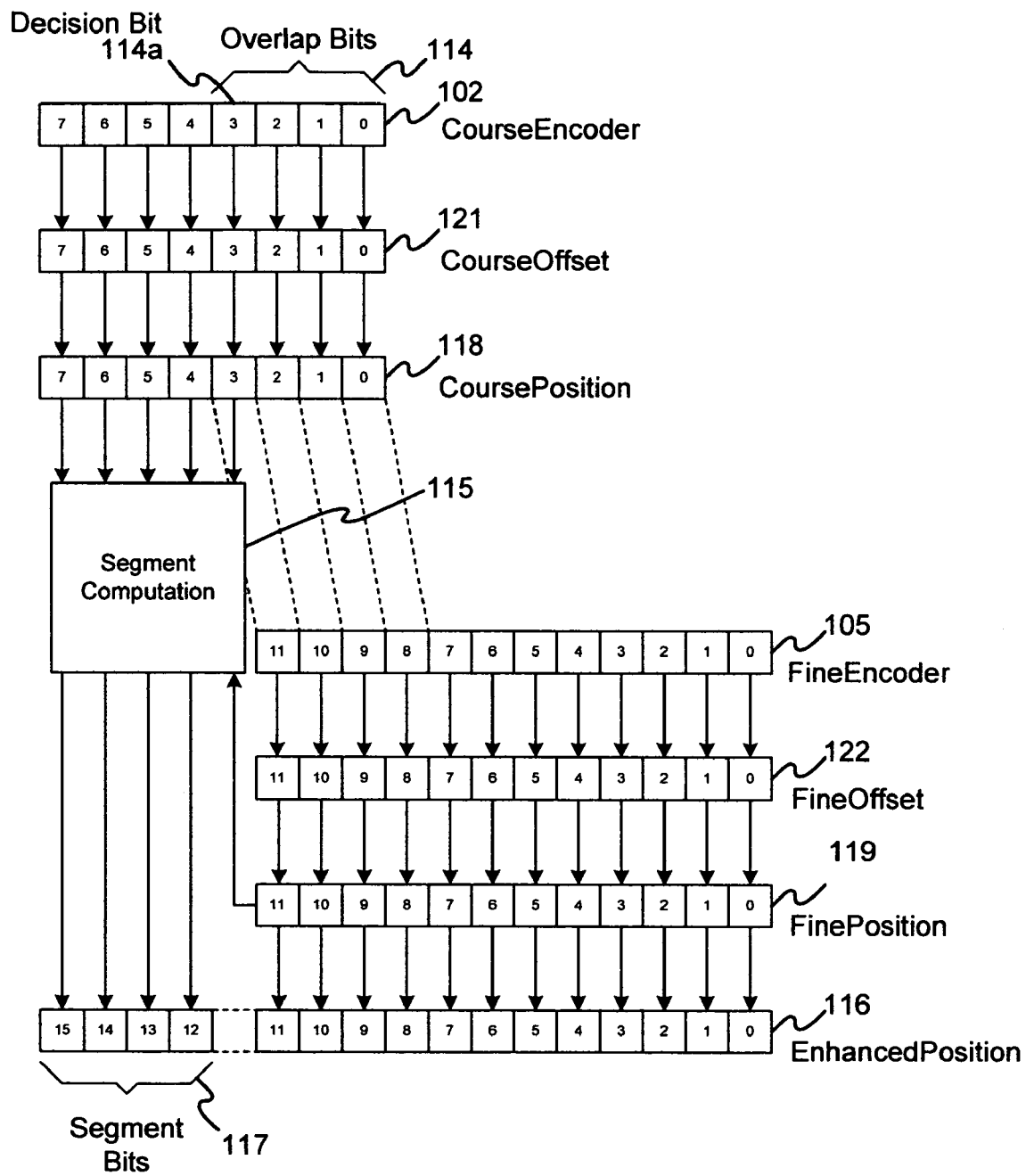
FIG. 3 illustrates the relationship between the bit positions of the course and fine encoders, course and fine alignment offsets, alignment corrected course and fine position data, a segment processing block which produces a group of segment bits and a resultant enhanced resolution position.

FIG. 3 depicts the data flow within an exemplary embodiment of the invention wherein an eight bit course encoder 102 and a twelve bit fine encoder 105 with four overlap bits 114 are employed to produce an enhanced position 116 of sixteen bits. The most significant of the overlap bits is referred to singly as the decision bit 114a and has special significance for actual computational alignment correction between the course encoder 102 and fine encoder 105 as well as for analyzing the implication of the quantity of additional overlap bits.

A Course offset 121 and fine offset 122 are computed and stored as discussed in detail for FIG. 4 below. The course offset 121 is added to the current and subsequent readings of course encoder 102 to produce an offset corrected course position 118 that will be indirectly transferred or "mapped" into the upper four bits of the enhanced position 116. Fine offset 122 is added to the current and subsequent readings of fine encoder 105 to produce an offset corrected fine position 119 that is mapped directly into the twelve low order bits of the enhanced position 116.

For the proceeding discussion, the upper four bits of the enhanced position 116 will be herein referred to as the "Segment bits" 117. Each of the possible values of the segment bits 117 represent the angle of rotation of the course pulley 101 of FIG. 1 for which the fine pulley 104 of FIG. 1 has made a full rotation, wherein the maximum value that can be represented by the segment bits 117 is also the maximum of the previously described gear ratio minus one. While the upper four bits of course position 118 may generally be considered to represent the count of the rotations of the fine encoder 105, due to the possibility of errors related to temporal correlation of the course and fine encoder readings and error of mechanical offsets as discussed below, the upper four bits of course position 118 may not be directly mapped into the segment bits 117. To derive the actual segment bits 117, a pair of course position 118 and fine position 119 readings with a temporal correlation as specified below is collected and then sent to the segment computation block 115. Segment computation block 115 applies one of three specific mathematical computations to course position 118 that are selected based on the value of fine position 119. The result from the segment computation block 115 is then mapped into the segment bits 117 producing a full sixteen bit enhanced position 116 result.

As previously indicated, the maximum value of the segment bits 117, and therefore the quantity of bits required is determined by the gear ratio of the fine pulley 104 to the course pulley 101 minus one. For the exemplary embodiment of the current invention, the gear ratio is 16 therefore the maximum value of the segment bits 117 will be fifteen. Four bits are required to represent fifteen in binary, therefore four segment bits 117 are required. Although the actual requirement for the quantity of overlap bits 114 will be discussed in the sections covering FIGS. 6 and 7, for the exemplary embodiment of the present invention, four overlap bits are indicated, therefore required the resolution of the course encoder 102 is eight bits. Should it be determined from the discussion below that only three overlap bits 114 would be desirable between course encoder 102 and fine encoder 105, the course encoder resolution requirement would then be only seven bits while still maintaining sixteen bits of resolution for enhanced position 116.

Figure 4:
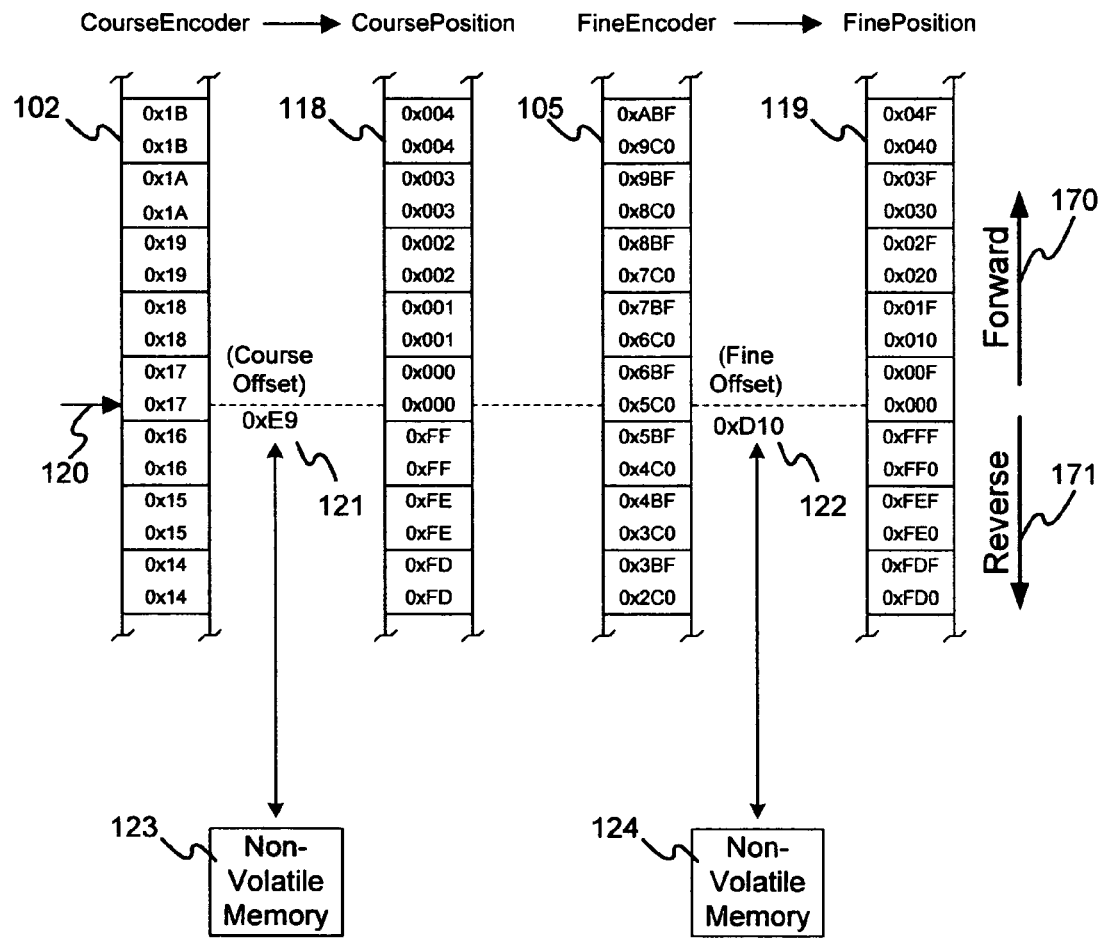
FIG. 4 illustrates the relationship between the course and fine encoder data at an arbitrarily chosen axis alignment decision point, the resulting course and fine alignment offsets, offset memory storage and aligned encoder position data.

In the exemplary embodiment of the present invention as illustrated in FIG. 4 and for which it would be desirable for simplification of manufacture, when the course encoder 102 and fine encoder 105 are assembled into the mechanical system a random rotational position for each sensor relative to the other will likely be observed. The present invention provides a means to compensate for, and describes the implications of, what will herein be termed "misalignment". This misalignment is manifested in the encoder position data during rotation of the sensed axis as a change in the upper four bits of course encoder 102 which occurs before or after but not exactly at the same time as a fine encoder 105 count overflow or underflow. In the exemplary embodiment of the present invention, an overflow of fine encoder 105 would be the count from fine encoder 105 incrementing from 0xFFF to 0x000 during a rotation in the forward direction 170 of the axis while an underflow would be the count decrementing from 0x000 to 0xFFF during a rotation in the reverse direction 171 of the axis. A second source of misalignment stems from any delay introduced between the course encoder 102 and fine encoder 105 readings. Because of this delay, if the axis were moving even a system with perfect mechanical alignment would have data that is temporally misaligned. Temporal and mechanical misalignment have generally the same effect on the operation of this invention.

FIG. 4 illustrates the method by which the random alignment between the course encoder 102 and fine encoder 105 may be numerically corrected. In the exemplary embodiment, offsets which are computed as detailed below and subsequently applied to the encoder data produce position data wherein a condition herein termed as "Alignment" is established for the position data. The mathematical implications of alignment as regards the number of overlap bits available will be discussed in more detail below in the text relating to FIGS. 5 through 7.

The underlying binary mathematics commonly used in computers as referenced in the proceeding sections that involve addition, subtraction, division and other operations for fixed numbers of bits are familiar to those skilled in the art so will not be covered here in detail. All operations will be unsigned integer operations.

As shown in FIG. 4 and while the axis is not rotating for the purpose that mechanical and not temporal misalignment will be in effect, an alignment decision point 120 is established. At alignment decision point 120, course encoder 102 is read and this "Course alignment position" is subtracted from zero resulting in course offset 121. Likewise, fine encoder 105 is read and this "Fine alignment position" is subtracted from zero resulting in fine offset 122.

The course offset 121 and fine offset 122 should then be stored in non-volatile memory locations 123 and 124 respectively such that they may be retrieved even if power to the computer should be lost or otherwise cycled. The course and fine alignment positions and subsequent offset computations need only be done once when the system is first initialized, as in just after assembly, or when the system has been altered whereby the rotational alignment between course encoder 102 and fine encoder 105 has changed rendering the current offsets invalid.

Once stored in non-volatile memory locations 123 and 124, the course offset 121 and fine offset 122 may then be retrieved for subsequent use as detailed below, such as when power has been cycled to the computer for example.

As illustrated in FIG. 4 for the randomly selected alignment decision point 120 as well as for subsequent readings of the axis position data whether static or moving, the course offset 121 is added to any data read from course encoder 102 to produce an aligned course position 118. Fine offset 122 is likewise added to any data read from fine encoder 105 to produce an aligned fine position 119. Course position 118 and fine position 119 may then be applied as shown graphically in FIG. 5 and programmatically in FIG. 8 to yield the correct segment bits 117 of FIG. 3.

Figure 5:
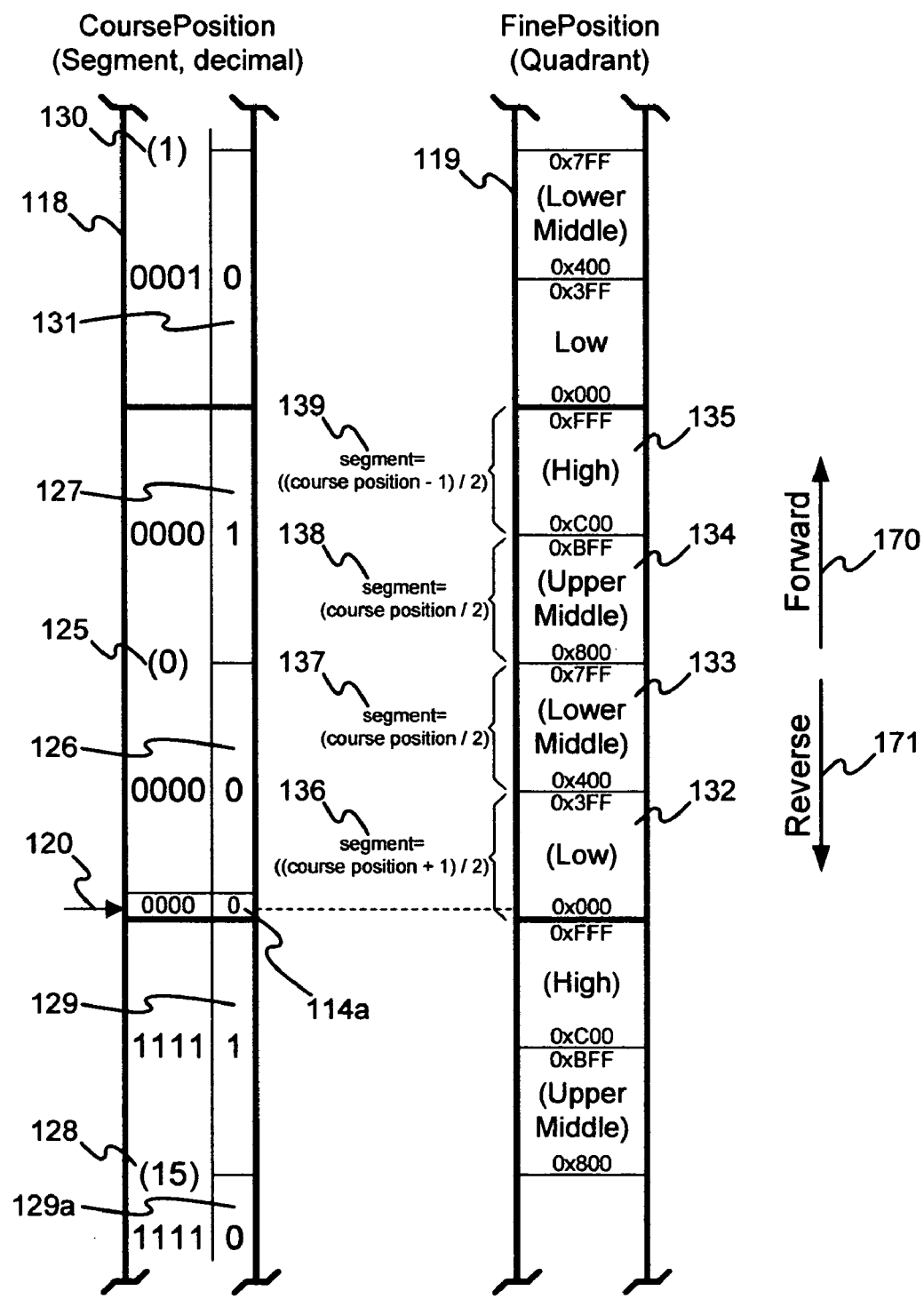
FIG. 5 illustrates the correlation between the quadrants of the fine position data and the course position data, and the computational rules used to derive an alignment corrected segment result.

FIG. 5 illustrates the relationship between the aligned course position 118 and the quadrants of the aligned fine position 119 where a quadrant is herein defined as the total available counts of fine position 119 divided into four equal sections. In the exemplary embodiment of the present invention the range of values for fine position 119 from 0x000 to 0x3FF is the "Low" quadrant 132, 0x400 to 0x7FF is the "Lower middle" quadrant 133, 0x800 to 0xBFF is the "Upper middle" quadrant 134 and 0xC00 to 0xFFF is the "High" quadrant 135. In the exemplary embodiment of the present invention, and after the alignment procedure of FIG. 4 has been accomplished, computation of the segment bits 117 of FIG. 3 requires only the upper five bits of course position 118. The lower three bits of course position 118 are mathematically discarded and so for ease of illustration only the five most significant bits will be considered for the rest of the discussion of FIG. 5.

In general, for any embodiment of the present invention wherein a quantity of "n" segment bits 117 of FIG. 1 is indicated, a number of most significant bits equal to "n+1" from course position 118 shall be required for the following computations.

For the following discussions of FIG. 5, computations on correlated readings of the course position 118 in the following paragraphs are performed using five bit binary integer arithmetic as would be typical in a computer used for this purpose and as would be familiar to those skilled in the art. A course position 118 reading that is correlated to a fine position 119 quadrant but is read at a time or alignment that is in the reverse 171 direction with respect to quadrant is herein referred to as "Reverse misaligned". A course position 118 reading that is correlated to a fine position 119 quadrant and is read at a time or alignment that is within the quadrant is herein referred to as "Aligned". A course position 118 reading that is correlated to a fine position 119 quadrant but is read at a time or alignment that is in the forward 170 direction with respect to this quadrant is herein referred to as "Forward misaligned". Alignment between the course position 118 and fine position 119 will be considered "Perfect" for the four following sections, yielding alignment correction limits at the theoretical maximums with realistic alignment being considered in the discussion that follows for FIG. 6. Each computed "Segment" for the FIG. 5 examples below will in practice be applied to the segment bits 117 of FIG. 3 and represent the count of fine position 119 revolutions.

Referring to FIG. 5, each of the possible ranges for course position 118, i.e. reverse misaligned, aligned and forward misaligned will be computed below where the value of the correlated fine position 119 lies within the low quadrant 132. As indicated for low quadrant 132, computation 136 will be employed. The computed segment for a reverse misaligned reading within the upper half 129 of course position segment fifteen 128 would be ((31+1)/2)=0, indicating the correct segment zero 125. The computed segment for an aligned reading within the lower half 126 of course segment zero 125 would be ((0+1)/2)=0, indicating the correct segment zero 125. The computed segment for a forward misaligned reading within the lower half 126 of course segment zero 125 would be ((0+1)/2)=0, indicating the correct segment zero 125. Low quadrant 132 can therefore be seen as having a maximum range of alignment correction of minus two quadrants from its lower bound of 0×000 to plus one quadrant from its upper bound of 0×3FF.

Referring to FIG. 5, each of the possible ranges for course position 118, i.e. reverse misaligned, aligned and forward misaligned will be computed below where the value of the correlated fine position 119 lies within the lower middle quadrant 133. As indicated for lower middle quadrant 133, computation 137 will be employed. The computed segment for a reverse misaligned reading within the lower half 126 of course segment zero 125 would be (0/2)=0, indicating the correct segment zero 125. The computed segment for an aligned reading within the lower half 126 of course segment zero 125 would be (0/2)=0, indicating the correct segment zero 125. The computed segment for a forward misaligned reading within the upper half 127 of course segment zero 125 would be (1/2)=0, indicating the correct segment zero 125. Lower middle quadrant 133 can therefore be seen as having a maximum range of alignment correction of minus one quadrant from its lower bound of 0×400 to plus two quadrants from its upper bound of 0×7FF.

Referring to FIG. 5, each of the possible ranges for course position 118, i.e. reverse misaligned, aligned and forward misaligned will be computed below where the value of the correlated fine position 119 lies within the upper middle quadrant 134. As indicated for upper middle quadrant 134, computation 138 will be employed. The computed segment for a reverse misaligned reading within the lower half 126 of course segment zero 125 would be (0/2)=0, indicating the correct segment zero 125. The computed segment for an aligned reading within the upper half 127 of course segment zero 125 would be (1/2)=0, indicating the correct segment zero 125. The computed segment for a forward misaligned reading within the upper half 127 of course segment zero 125 would be (1/2)=0, indicating the correct segment zero 125. Upper middle quadrant 134 can therefore be seen as having a maximum range of alignment correction of minus two quadrants from its lower bound of 0×800 to plus one quadrant from its upper bound of 0×BFF.

Referring to FIG. 5, each of the possible ranges for course position 118, i.e. reverse misaligned, aligned and forward misaligned will be computed below where the value of the correlated fine position 119 lies within the high quadrant 135. As indicated for high quadrant 135, computation 139 will be employed. The computed segment bits for a reverse misaligned reading within the upper half 127 of course segment zero 125 would be ((1−1)/2)=0, indicating the correct segment zero 125. The computed segment for an aligned reading within the upper half 127 of course segment zero 125 would be (1/2)=0, indicating the correct segment zero 125. The computed segment for a forward misaligned reading within the lower half 131 of course segment one 130 would be ((2−1)/2)=0, indicating the correct segment zero 125. High quadrant 135 can therefore be seen as having a maximum range of alignment correction of minus one quadrant from its lower bound of 0×C00 to plus two quadrants from its upper bound of 0×FFF.

Misalignment beyond the limits detailed above would yield an incorrect value for the segment bits 117 of FIG. 3 results as will now be demonstrated for examples or course position 118 values correlated with but outside the correction limits of low quadrant 132 of fine position 119, again employing the indicated computation 136. The computed segment for a reverse misaligned reading within the lower half 129a of course segment fifteen 128 would be ((30+1)/2)=15, indicating the incorrect course segment fifteen 128. The computed segment for a forward misaligned reading within the upper half 127 of course segment zero 125 would be ((1+1)/2)=1, indicating the incorrect course segment one 130. Similarly for the remaining quadrants, application of the prescribed computations for values of course position 118 below and above the allowable correction limits would result in computed values for the segment bits 117 of FIG. 3 that would lie before and after, respectively, the desired course segment.

As previously stated, the resulting ranges of correction of (minus two to plus one) and (minus one to plus two) quadrants of misalignment correction for the (low and upper middle) and (lower middle and high) quadrants respectively represent the theoretical maximum limits for perfect alignment wherein an infinite quantity of overlap bits would be necessary. Practical limits of correction in practice arise from the uncertainty of the actual position of the one-to-zero or zero-to-one transition of the first overlap bit 114a relative to the 0×FFF(All ones)-to-0×000(All zeros) or 0×000(All zeros)-to-0×FFF (All ones) transitions respectively of low quadrant 132.

By way of example, if only one overlap bit were available, and the alignment decision point 120 is made at an arbitrary point as shown in FIG. 5 wherein the reading of the course encoder at this instant was zero, the resulting offset and therefore the course position 118 would be zero. If the one-to-zero transition of the decision bit 114a was exactly aligned with the bottom of low quadrant 132, then the theoretical correction limits would be realized. If however, the actual one-to-zero transition of the decision bit 114a were shifted down almost one bit or just less than two quadrants of fine position 119, a small forward 170 movement of the axis away from alignment decision point 120 would cause the decision bit 114a to flip from zero-to-one while the fine position 119 would still be at the bottom of low quadrant 132, i.e. nearly 0×000. Application of the prescribed segment computation 136 for the low quadrant 132 position at this point would be ((1+1)/2)=1, indicating the incorrect course segment one 130. A similar error would be introduced if the bit were a one at the alignment point, introducing an uncertainty as to the actual location of the one-to-zero transition. This section illustrates the worst case correction result stemming from the availability of only a single overlap bit. For minimization of alignment uncertainty, one or more additional overlap bits may be employed as illustrated in the detailed logical analysis that follows.

Figure 6:
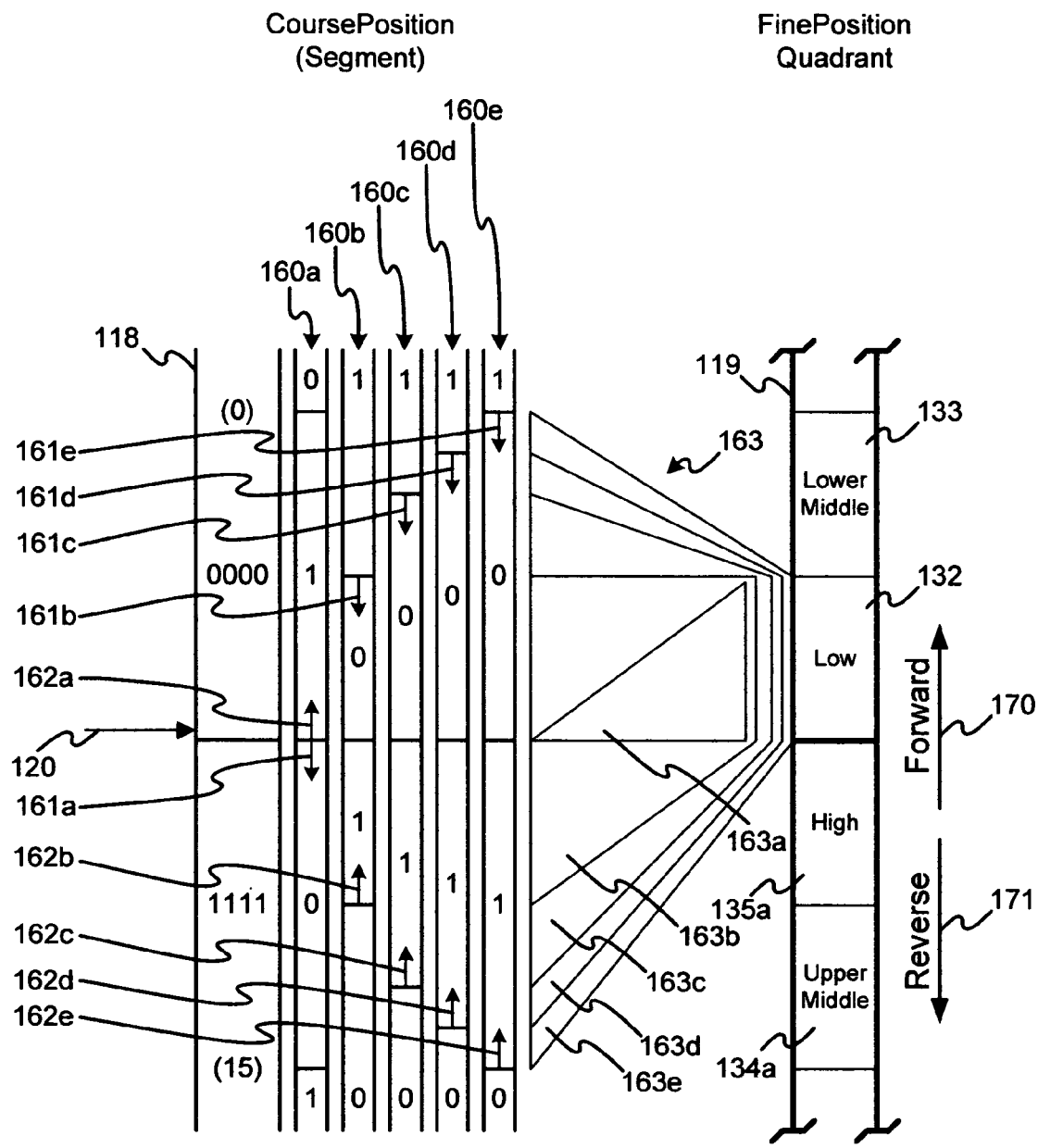
FIG. 6 illustrates a logical analysis of the ranges of mechanical and or temporal alignment correction, between the course position and the exemplary low quadrant of the fine position data, that may be corrected versus the quantity of available bits of overlap between the course and fine encoders, and that may be similarly applied to the three other quadrants of the fine position data.
Figure 7:
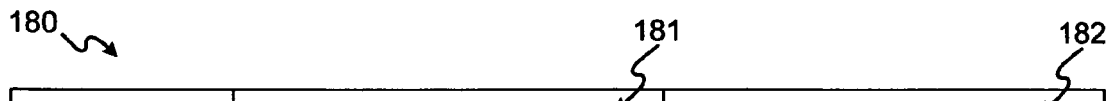
FIG. 7 illustrates the formulae required for mathematical computation of the actual limits of forward and reverse alignment correction for all possible fine position quadrants versus the quantity of available bits of overlap between the course and fine encoders.

FIG. 6 illustrates the impact of overlap bit quantity with regard to the actual transition edge uncertainty as demonstrated for the low quadrant 132 of fine position 119 for alignment and graphically shown as ranges of alignment correction 163 for one, two, three, four and an infinite quantity of overlap bits in the forward direction 170 and the reverse direction 171.

Referring to FIG. 6, the upper four bits of course position 118 are all ones below and all zeros above the alignment decision point 120. Bit columns 160a, 160b, 160c, 160d and 160e represent the alignment uncertainty for the decision bit when one, two, three, four and an infinite quantity respectively of overlap bits are available for the alignment procedure of FIG. 4. Note that the bit columns 160a to 160e represent the decision bit only and not the remaining overlap bits so that the overlap bit impacts may be compared side by side. A perfectly aligned mechanical system in which essentially an infinite quantity of overlap bits are available, represented by bit column 160e, indicates the zero bit 161e after alignment lies completely above the decision point 120. Zero bit 161e has no uncertainty as to its alignment with respect to the low quadrant 132 and lower middle quadrant 133 and so its correction limit it the same as the theoretical limit. One bit 162e likewise has no uncertainty as to its alignment with respect to the high quadrant 135a and quadrant 134a. The range of correction 163e represents the maximum alignment correction that may be attained for any number of overlap bits.

As described above for FIG. 5, bit column 160a illustrates how a single overlap bit wherein the decision bit and overlap bit are one in the same affects the uncertainty of encoder alignment. In general, it may be considered that the uncertainty of alignment is equal to the span of the least significant overlap bit so that the zero bit 161a has a worst case uncertainty span of an entire bit downward such that no correction in the forward direction 170 is available. Similarly, the one bit 162a has a worst case uncertainty span of an entire bit upward such that no correction in the reverse direction 171 is available. Range 163a therefore represents the worst case range of correction of zero reverse and minus one forward correction quadrants afforded by a single overlap bit, i.e. none.

Bit column 160b illustrates how a two overlap bits affect the uncertainty of encoder alignment. Since the least significant of the overlap bits is one half the span of the decision bit, zero bit 161b will shift down one half decision bit and one bit 162b will shift up one half decision bit worst case. Range 163b therefore represents the worst case range of correction of the one reverse and zero forward correction quadrants afforded by two overlap bits, i.e. reverse and aligned, but no forward correction.

Bit column 160c illustrates how a three overlap bits affect the uncertainty of encoder alignment. Since the least significant of the overlap bits is one quarter the span of the decision bit, zero bit 161c will shift down one quarter decision bit and one bit 162c will shift up one quarter decision bit worst case. Range 163c therefore represents the worst case range of correction of the one and one half reverse and one half forward correction quadrants afforded by three overlap bits, i.e. reverse, aligned and forward correction. Essentially, this amount of correction would allow correlated readings of the encoders to occur within the amount of time whereby the axis has not moved more than one half quadrant of angle.

Bit column 160d illustrates how a four overlap bits affect the uncertainty of encoder alignment. Since the least significant of the overlap bits is one eighth the span of the decision bit, zero bit 161d will shift down one eighth decision bit and one bit 162d will shift up one eighth decision bit worst case. Range 163d therefore represents the worst case range of correction of the one and one three quarters reverse and three quarters forward correction quadrants afforded by four overlap bits, i.e. reverse, aligned and forward correction.

Low quadrant 132 and upper middle quadrant 134a exhibit identical ranges of correction while lower middle quadrant 133 and high quadrant 135a exhibit ranges of correction which are a mirror image of the correction range of low quadrant 132. The equations in table 180 of FIG. 7 define the actual limits of correction for all possible quantities of course position overlap bits. A positive result from the forward alignment equations 181 indicate ranges of forward correction whereas a negative result indicates reverse correction. Conversely, negative results from the reverse alignment equations 182 indicate ranges of reverse uncertainty instead of correction whereas a positive result indicates forward uncertainty instead of correction.

For the purpose of implementation, the theoretical limits of correction of plus minus two and plus one, and minus one and plus two quadrants would indicate that for any combination of course and fine encoder readings, one may expect at least a range of plus and minus one quadrants of correction. The system implication of this range of correction is that for any fine position reading, the corresponding course position reading may be taken no longer than the minimum time the axis may be expected to rotate the through and angle defined by one fine position quadrant. Conversely, the axis may not rotate faster through the angle defined by a single fine position quadrant than the maximum time expected to elapse between a fine position reading and the corresponding course position reading. Actual correction will be reduced to an amount as determined by the appropriate equation from table 180.

By way of example, an exemplary system as shown in FIG. 1 with encoders of the resolution as depicted in FIG. 3 with perfect alignment where the predefined condition is a maximum axis rotation of 180 degrees per second, one fine position quadrant will be 360 degrees divided by 16 segments divided by 4 quadrants per segment or 5.625 degrees per quadrant. 5.625 degrees per quadrant divided by 180 degrees per second indicates no more than 31.25 milliseconds may elapse between course and fine position readings if the temporal alignment is to be properly corrected.

By way of example, an exemplary system as shown in FIG. 1 with encoders of the resolution as depicted in FIG. 3 with perfect alignment where the predefined condition is a maximum of 200 microseconds will elapse between course and fine position readings, one fine position quadrant will be 360 degrees divided by 16 segments divided by 4 quadrants per segment or 5.625 degrees per quadrant as was the case for the previous example. 5.625 degrees per quadrant divided by 200 microseconds between readings in that quadrant of rotation is 28,125 degrees per second is indicated as the maximum allowable rotational speed of the axis if the temporal alignment of the course and fine position readings is to be properly corrected.

Figure 8:
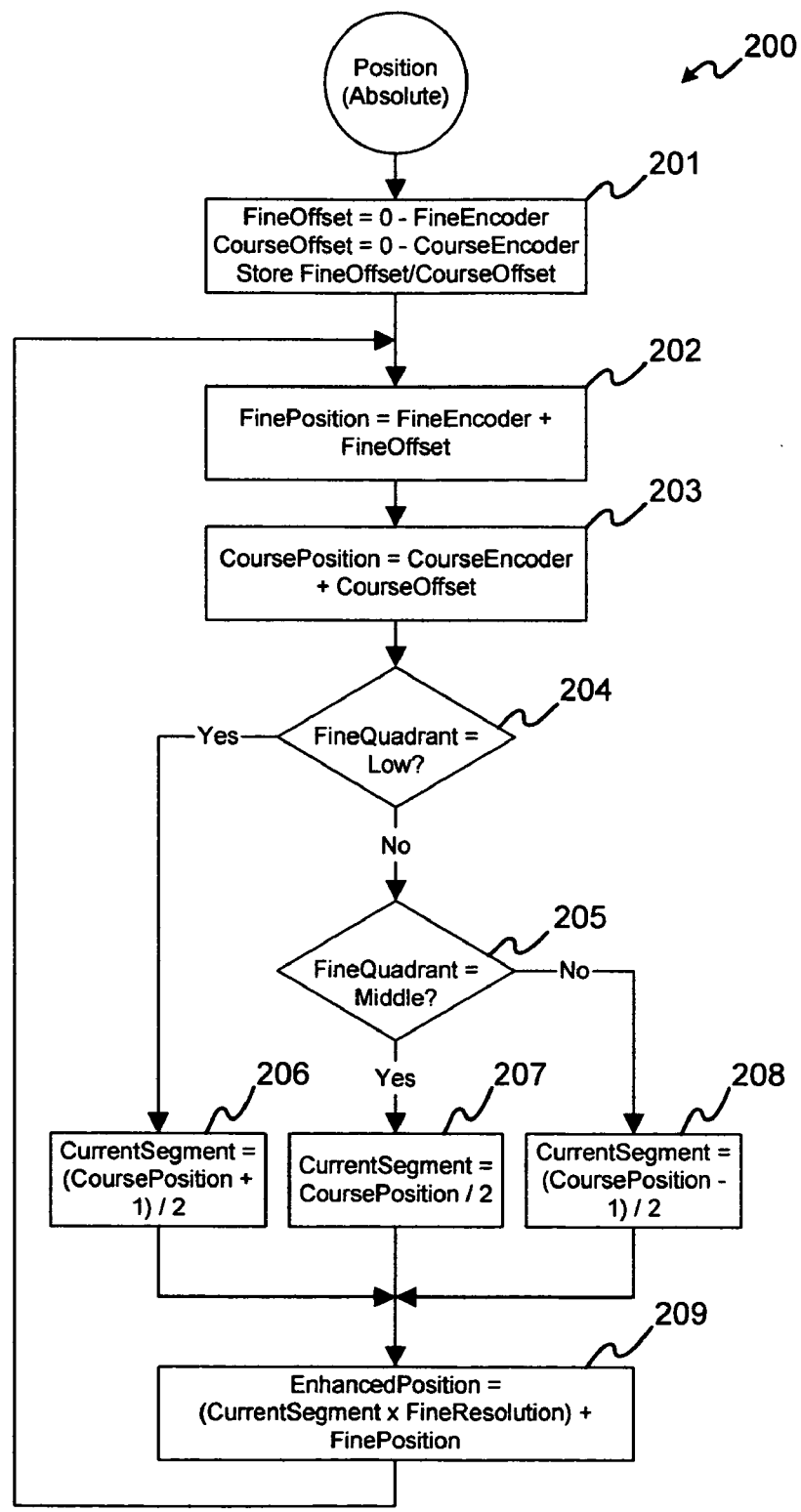
FIG. 8 illustrates an exemplary flowchart of a software program used to numerically align the course and fine encoder data and then repeatedly compute an enhanced resolution position from sets of correlated course and fine position data.

Referring to FIG. 8, flow chart 200 illustrates an exemplary algorithm to implement method for the present invention. An alignment cycle 201 is performed at system initialization whereby fine and course offsets are computed from an arbitrary fine and course encoder reading and stored for later use. In 202 and 203 the current fine and course encoder positions are read and adjusted with their respective alignment offsets. In 204, if the fine position quadrant is low then the current segment is computed in 206 from the course position reading with the low quadrant formula else in 205, if the quadrant is either of the middle quadrants then the current segment is computed in 207 from the course position reading with the middle quadrant formula else the current segment is computer in 208 from the course position reading with the high quadrant formula. The current segment and fine position data are then merged in 209 to form the enhanced position data. Repeating the process starting at 202 performs subsequent enhanced position updates.

FIG. 2—Additional Embodiment

Another means to alleviate backlash could be realized as depicted in a second exemplary embodiment of the present invention as shown in FIG. 2 wherein encoder system 100b illustrates an alternative, but not necessarily the only other configuration of the elements required to realize the present invention. The embodiment of the invention shown in FIG. 2 consists of a course encoder 102 coupled to course gear 112 by way of coupler 103 and fine encoder 105 coupled to fine gear 113 by way of fine coupler 106 as required by the models of course and fine encoders employed. The arrangement of these encoders that are coupled to gears 112 and 113 and that are outside of the drive chain consisting of drive gear 111 and output gear 110 whereby that drive force is not transmitted through the gears to which encoders are coupled may reduce the drive force induced backlash errors.

Additional benefits of the embodiment of this invention as depicted in FIG. 2 may include but not be limited to those described below. Where the axis of rotation represented by output gear 110 is not easily accessible for coupling, the course encoder 102 may be coupled into the system off the axis that it is meant to measure. Additionally, the gear 112 may be of an anti-backlash type to further reduce backlash induced errors as may be desirable in the system design or multiple stages of gear reduction may be placed between the course gear 112 and fine gear 113 as dictated by the availability of these gears.

Per the detailed discussion above for encoder system 100a, the gear ratio of the course gear 112 to the fine gear 113, when multiplied by the resolution of the fine encoder 105 determines the resolution of the entire encoder system. In accordance with the previously stated convention for the encoder system 100a, for the alternative embodiment of the encoder system 100b, movement of the axis in the forward direction 170 as reported by both the course encoder 102 and fine encoder 105 will be indicated as an increase in counts whereas a movement of the axis in the reverse direction 171 as reported by both the course encoder 102 and fine encoder 105 will be indicated as a decrease in counts.

ADVANTAGES

From the description above, a number of advantages of the present enhanced absolute position sensor system method becomes evident: Off the shelf absolute encoders of lower resolution, and therefore significantly lower cost than a single absolute encoder of an equivalent desired resolution for a target system may be employed to produce an enhanced absolute position reading. Mechanisms generally already present, or simple dedicated mechanisms, in a typical mechanical system may be utilized for the mechanical multiplication of the output axis rotations instead of dedicated, intricate or precision mechanisms. When the encoder system uses existing mechanisms, errors due to backlash or other similar sources are not then compounded by additional, uncorrelated errors, as are typically introduced by a stand-alone multi-turn encoder. When a dedicated rotation multiplication mechanism is employed, errors in the mechanism may be specifically controlled. The method described above reduces or eliminates a need for precise alignment of the multiple absolute encoders and whatever alignment errors have been introduced in the construction of the encoder system may then be mathematically reduced or eliminated such that little or no uncertainty or positional errors are introduced into the enhanced position data.

We claim:

1. A method for computing an enhanced absolute position reading for a sensed axis comprising:
   (a) providing a first absolute encoder that is coupled to the sensed axis so as to rotate in concert with the sensed axis;
   (b) providing a second absolute encoder which is coupled to the sensed axis so as to rotate an integer number of times greater than one for each single rotation of the sensed axis;
   (c) providing a means by which data may be read from the first absolute encoder and the second absolute encoder;
   (d) providing a non-volatile memory that is able to store a plurality of data;
   (e) providing a general purpose computer for the purpose of the reading and manipulation of data from the first and second absolute encoders, storage of data in the non-volatile memory, selecting from a plurality of formulas for the purpose of computing the enhanced absolute position reading and for the transmission of the enhanced absolute position reading which will;
      (1) read a course alignment data from the first absolute encoder temporally correlated to a reading of a fine alignment data from the second absolute encoder at an arbitrary alignment decision point at which time the axis is not in motion;
      (2) subtract the course alignment data from zero to produce a course offset and subtract the fine alignment data from zero to produce a fine offset;
      (3) store the course and fine offsets into the non-volatile memory;
      (4) read a course position data from the first absolute encoder and a fine position data from the second absolute encoder at which time the axis may be stationary or in motion;
      (5) add the course offset to the course position data to produce an aligned course position and adding the fine offset to the fine position data to produce an aligned fine position;
      (6) select a formula from the plurality of formulas, the selection which is made based on the value of the aligned fine position and which is then applied to the aligned course position to produce a current segment result;
      (7) concatenating the current segment result to the aligned fine position whereby the current segment result forms the most significant bits and the aligned fine position forms the least significant bits of the enhanced absolute position reading;
      (8) transmitting the enhanced absolute position reading for subsequent use the general purpose computer or an other computer; and
      (9) repeat steps (1) through (8) whenever an alignment operation for the encoders is required as when the alignment operation has not yet occurred or when the course or fine encoders have been mechanically repositioned with respect to each other; or
      (10) repeat steps (4) through (8) whenever said alignment operation has already been performed whereby the course and fine offsets may first be retrieved from the non-volatile memory in lieu of performing steps (1) to (3);
   whereby the enhanced absolute position reading of the axis as reported by the first and second encoders and processed by the general purpose computer will not be degraded by mechanical misalignment between the first and second encoders or by reasonable temporal misalignment between the readings of the first and second encoders and which will not require repeated initialization of the fine and course offsets even in the event of power loss.

* * * * *